US012229879B2

(12) United States Patent
Xu et al.

(10) Patent No.: US 12,229,879 B2
(45) Date of Patent: Feb. 18, 2025

(54) IMAGE RENDERING METHOD AND RELATED APPARATUS, TERMINAL AND STORAGE MEDIUM

(71) Applicant: TENCENT TECHNOLOGY (SHENZHEN) COMPANY LIMITED, Guangdong (CN)

(72) Inventors: Huabing Xu, Shenzhen (CN); Shun Cao, Shenzhen (CN); Nan Wei, Shenzhen (CN); Xiaochun Cui, Shenzhen (CN); Congbing Li, Shenzhen (CN); Rongxin Zhou, Shenzhen (CN); Wenyan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 559 days.

(21) Appl. No.: 17/697,372

(22) Filed: Mar. 17, 2022

(65) Prior Publication Data
US 2022/0207821 A1 Jun. 30, 2022

Related U.S. Application Data

(63) Continuation of application No. PCT/CN2020/127667, filed on Nov. 10, 2020.

(30) Foreign Application Priority Data

Feb. 6, 2020 (CN) .......................... 202010081668.9

(51) Int. Cl.
G06T 15/60 (2006.01)
A63F 13/52 (2014.01)
(Continued)

(52) U.S. Cl.
CPC .............. *G06T 15/60* (2013.01); *A63F 13/52* (2014.09); *G06T 15/04* (2013.01); *G06T 15/06* (2013.01);
(Continued)

(58) Field of Classification Search
CPC ......... G06T 15/60; G06T 15/04; G06T 15/06; G06T 15/506; G06T 2215/12; G06T 2210/36; G06T 15/005; A63F 13/52
See application file for complete search history.

(56) References Cited

U.S. PATENT DOCUMENTS

2011/0032256 A1 2/2011 Ha
2015/0371435 A1* 12/2015 Zhu .......................... G06T 15/60
345/426
2018/0357780 A1* 12/2018 Young ..................... G06T 11/20

FOREIGN PATENT DOCUMENTS

CN 102768765 A 11/2012
CN 103049914 A 4/2013
(Continued)

OTHER PUBLICATIONS

International Search Report dated Feb. 18, 2021 issued in International Application No. PCT/CN2020/127667.
(Continued)

*Primary Examiner* — Said Broome
*Assistant Examiner* — Andrew Shin
(74) *Attorney, Agent, or Firm* — Sughrue Mion, PLLC

(57) ABSTRACT

An image rendering method and a related apparatus, terminal and storage medium that: obtains a low-resolution first shadow map and a high-resolution second shadow map of a target virtual object, determines a first texel range of each texel and a central point in the first shadow map, performs scaling processing, based on the central point, on the first texel range by using a scaling coefficient to obtain a second
(Continued)

texel range, and performs shadow rendering on the target virtual object according to the second texel range. A shadow map-based image rendering process is implemented, and since a calculation amount of determining a map position according to a low-resolution map is relatively small, image rendering efficiency is improved. Additionally, rendering of a high-resolution shadow map is completed, generation of edge aliasing is avoided, and an image rendering effect is improved.

20 Claims, 9 Drawing Sheets

(51) Int. Cl.
    *G06T 15/04*     (2011.01)
    *G06T 15/06*     (2011.01)
    *G06T 15/50*     (2011.01)

(52) U.S. Cl.
    CPC ........ *G06T 15/506* (2013.01); *G06T 2215/12* (2013.01)

(56) References Cited

FOREIGN PATENT DOCUMENTS

| | | |
|---|---|---|
| CN | 111292405 A | 6/2020 |
| WO | 2018/227100 A1 | 12/2018 |

OTHER PUBLICATIONS

Written Opinion dated Feb. 18, 2021 issued in International Application No. PCT/CN2020/127667.
Extended European Search Report issued Feb. 28, 2023 in European Application No. 20917446.5.
Yin Jin, "Research of an Algorithm of Real-time Shadow Rendering Based on Shadow Map Anti-aliasing", Chinese Master's Theses Full-Text Database, 2011, pp. 1-40 (48 pages total).

* cited by examiner

IMAGE RENDERING METHOD AND RELATED APPARATUS, TERMINAL AND STORAGE MEDIUM

CROSS-REFERENCE TO RELATED APPLICATION(S)

This application is a continuation application of International Application No. PCT/CN2020/127667, filed on Nov. 10, 2020, which claims priority to Chinese Patent Application No. 202010081668.9, filed with the China National Intellectual Property Administration on Feb. 6, 2020, the disclosures of which are incorporated by reference in its entireties.

FIELD

The present disclosure relates to the field of computer technologies, and in particular, to an image rendering method and a related apparatus.

BACKGROUND

In many application programs constructing a three-dimensional virtual environment, shadow display of a virtual object is an important mean to improve a display effect of the three-dimensional virtual environment.

Generally, in game rendering, a shadow map technology is used to calculate a shadow of an object in real time. Shadow map rendering is first performed on a scene in the view of a light source to store distance information of the object to the light source, and normal rendering is then performed from a point of sight on each pixel in the scene to calculate a position of the light source. In addition, the distance information is compared with a distance stored in a shadow map, to determine whether the object is in a shadow, and further calculate the shadow of the object according to a situation of the shadow.

However, the shadow map needs to be rendered based on a view of sight of the light source, and sampling need to be performed on the shadow map during normal rendering to perform shadow calculation. When the scene complexity is relatively high, namely, there are a large number of objects and light sources, if shadow calculation of the entire scene is performed on the light sources one by one, a calculation amount is huge, and shadow rendering efficiency is affected, and if shadow calculation is performed through partial sampling, a phenomenon of edge aliasing may be easily generated, and a shadow rendering effect is affected.

SUMMARY

In view of this, the disclosure provides an image rendering method, which can effectively resolve the problem of a huge calculation amount of shadow rendering in a complex scene, thereby improving efficiency of an image rendering process and a rendering effect.

A first aspect of the disclosure may provide an image rendering method, applicable to a system or program including an image rendering function in a terminal device, the method specifically including: obtaining a first shadow map and a second shadow map of a target virtual object, a resolution of the first shadow map being less than a resolution of the second shadow map;

determining a first texel range of each texel and a central point in the first shadow map, the first texel range being set based on a transition distance of a shadow edge, and the transition distance being used for indicating a shadow edge of the target virtual object in the first shadow map;

performing, based on the central point, scaling processing on the first texel range by using a scaling coefficient, to obtain a second texel range, the scaling coefficient being obtained based on a ratio of the resolution of the first shadow map to the resolution of the second shadow map; and performing shadow rendering on the target virtual object according to the second texel range.

A second aspect of the disclosure may provide an image rendering apparatus, including: an obtaining unit, configured to obtain a first shadow map and a second shadow map of a target virtual object, a resolution of the first shadow map being less than a resolution of the second shadow map;

a determining unit, configured to determine a first texel range of each texel and a central point in the first shadow map, the first texel range being set based on a transition distance of a shadow edge, and the transition distance being used for indicating a shadow edge of the target virtual object in the first shadow map;

a scaling unit, configured to perform, based on the central point, scaling processing on the first texel range by using a scaling coefficient, to obtain a second texel range, the scaling coefficient being obtained based on a ratio of the resolution of the first shadow map to the resolution of the second shadow map; and a rendering unit, configured to perform shadow rendering on the target virtual object according to the second texel range.

A third aspect of the disclosure may provide an image rendering method, including: obtaining a map packet, the map packet being used for indicating shadow rendering of a target virtual object, and the map packet including shadow maps under at least two resolutions;

performing preprocessing on the map packet in a central processing unit (CPU); and inputting the preprocessed map packet into a graphics processing unit (GPU), to perform the image rendering method according to the first aspect or any example embodiment of the first aspect.

A fourth aspect of the disclosure may provide an image rendering apparatus, including: an obtaining unit, configured to obtain a map packet in a central processing unit (CPU), the map packet being used for indicating shadow rendering of a target virtual object;

a processing unit, configured to perform preprocessing on the map packet in a central processing unit (CPU); and a rendering unit, configured to input the preprocessed map packet into a graphics processing unit (GPU), to perform the image rendering method according to the first aspect or any example embodiment of the first aspect.

A fifth aspect of the disclosure may provide a terminal device, including: a memory, a processor, and a bus system, the memory being configured to store program code; and the processor being configured to perform, according to instructions in the program code, the image rendering method according to the first aspect or any example embodiment of the first aspect, or the image rendering method according to the third aspect or any example embodiment of the third aspect.

A sixth aspect of the disclosure may provide a non-volatile computer-readable storage medium, storing instructions, the instructions, when run on a computer, causing the computer to perform the image rendering method according to the first aspect or any example embodiment of the first aspect, or the image rendering method according to the third aspect or any example embodiment of the third aspect.

A seventh aspect of the disclosure may provide a computer program product including instructions, the instructions, when run on a computer, causing the computer to perform the image rendering method according to the foregoing first aspect.

As can be seen from the foregoing technical solutions, the embodiments of the disclosure have the following advantages:

a first shadow map and a second shadow map of a target virtual object are obtained, where a resolution of the first shadow map is less than a resolution of the second shadow map; a first texel range of each texel and a central point in the first shadow map are determined; and scaling processing is performed, based on the central point, on the first texel range by using a scaling coefficient, to obtain a second texel range, and shadow rendering is further performed on the target virtual object according to the second texel range. In this way, a shadow map-based image rendering process is implemented, and since a calculation amount of determining a map position according to a low-resolution map is relatively small, image rendering efficiency is improved. A high-resolution shadow map is then rendered based on the position, thereby ensuring the definition of a shadow, avoiding generation of edge aliasing, and improving an image rendering effect.

BRIEF DESCRIPTION OF THE DRAWINGS

To describe the technical solutions of example embodiments of this disclosure more clearly, the following briefly introduces the accompanying drawings for describing the example embodiments. The accompanying drawings in the following description show only some embodiments of the disclosure, and a person of ordinary skill in the art may still derive other drawings from these accompanying drawings without creative efforts. In addition, one of ordinary skill would understand that aspects of example embodiments may be combined together or implemented alone.

DESCRIPTION OF EMBODIMENTS

Figure 1:
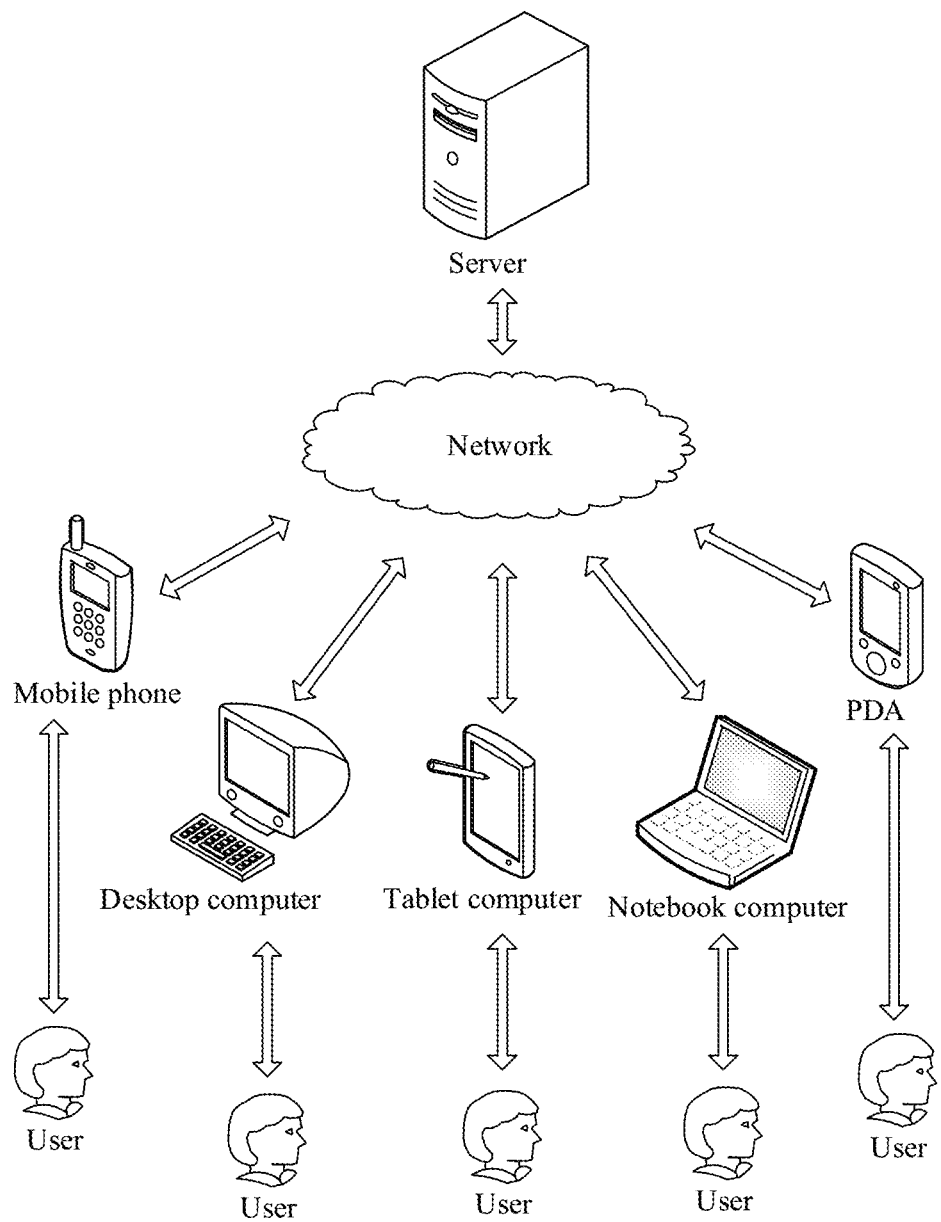
FIG. 1 is a diagram of a network architecture on which an image rendering system runs.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

Embodiments of the disclosure provide an image rendering method and a related apparatus, which may be applicable to a system or program including an image rendering function in a terminal device. A first shadow map and a second shadow map of a target virtual object are obtained, where a resolution of the first shadow map is less than a resolution of the second shadow map; a first texel range of each texel and a central point in the first shadow map are determined; and scaling processing is performed, based on the central point, on the first texel range by using a scaling coefficient, to obtain a second texel range, and shadow rendering is further performed on the target virtual object according to the second texel range. In this way, a shadow map-based image rendering process is implemented, and since a calculation amount of determining a map position according to a low-resolution map is relatively small, image rendering efficiency is improved. A high-resolution shadow map is then rendered based on the position, thereby ensuring the definition of a shadow, avoiding generation of edge aliasing, and improving an image rendering effect.

First, some terms that may appear in the embodiments of the disclosure are introduced.

Distance field (DF): a result obtained by performing distance transformation on an image. The distance transformation is used for calculating a distance of a point in the image relative to a nearest point on a target (such as an edge), and a grayscale of the pixel point by using a nearest distance obtained through calculation.

Shadow map: a technology that renders an entire scene in the view of a light source to generate a shadow in real time.

Shadow baking: used for generating texture for a virtual illumination operation with a huge calculation amount, also referred to as shadow mapping.

Virtual object: an object in a three-dimensional virtual environment. The virtual object may be at least one of a virtual building, a virtual plant, a virtual terrain, a virtual character, a virtual furniture, a virtual vehicle, or a virtual animal/pet.

Signed distance field (SDF): in a metric space, there is a set A, and an SDF function is used for defining a shortest distance from a fixed point X to an edge of the set A. If x is located on an inner side of the set A, a function value is greater than 0, and as x approaches the edge, the function value also approaches 0; and if x is located on an outer side of the set A, the function value is less than 0. The SDF function may also define the shortest distance by using a case that the function value is less than 0 when x is located on the inner side and the function value is greater than 0 when x is located on the outer side.

Texel: a texture pixel, which is a basic composition unit of a texture map. As a picture is formed by a group of pixels, in a texture space, a texture map is also formed by a group of texels.

Penumbra: when an opaque object blocks a light source, if the light source is a relatively large light-emitting object, a generated shadow includes two parts: a part that is totally dark is referred to as umbra, and a part that is half-light and half-dark is referred to as penumbra.

Ray tracing: ray tracing is a technology that is used for rendering a virtual scene in computer graphics science. During rendering, a light source is transmitted to a virtual scene from each pixel of an image, to calculate intersection points of an object and the scene and perform shading and rendering. Ray tracing can render a scene effect with a high sense of reality, but also required relatively high calculation overheads.

It is to be understood that, the image rendering method provided in the disclosure may be applicable to a system or program including an image rendering function in a terminal device, such as a game with a three-dimensional scene. Specifically, the image rendering system may be run on a network architecture shown in FIG. 1. FIG. 1 is a diagram of a network architecture on which the image rendering system runs. As can be known from the figure, the image rendering system may provide image rendering with a plurality of information sources, a terminal establishes a connection with a server through a network, to further receive a plurality of rendering data transmitted by the server, and a shadow of a virtual object in a virtual scene in the terminal is then rendered. It may be understood that, FIG. 1 shows a plurality of types of terminal devices. In an actual scene, more or fewer types of terminal devices may participate in an image rendering process, and a specific number and types are determined according to an actual scene, which are not limited herein. In addition, FIG. 1 shows a server, however, in an actual scene, more servers may participate in the process, especially in a scene where a plurality of virtual objects interact with each other, and a specific number of servers is determined according to an actual scene.

The image rendering method provided in this embodiment may be also performed offline, namely, without participation of the server. In this case, the terminal is connected to other terminals locally, to perform an image rendering process among terminals.

It may be understood that, the foregoing image rendering system may be run on a personal mobile terminal such as local game scene optimization software, or may be run on a server, or may be run on a third-party device to provide an image rendering processing result. Specifically, the image rendering system may be run on the foregoing device in the form of a program, or may be run as a system component in the foregoing device, or may serve as a type of cloud service program, and a specific running mode is determined according to an actual scene, which is not limited herein.

In many application programs constructing a three-dimensional virtual environment, shadow display of a virtual object is an important mean to improve a display effect of the three-dimensional virtual environment.

Generally, in game rendering, a shadow map technology is used to calculate a shadow of an object in real time. Shadow map rendering is first performed on a scene in the view of a light source to store distance information of the object to the light source, and normal rendering is then performed from a point of sight on each pixel in the scene to calculate a position of the light source. In addition, the distance information is compared with a distance stored in a shadow map, to determine whether the object is in a shadow, and further calculate the shadow of the object according to a situation of the shadow.

However, the shadow map needs to be rendered based on a view of sight of the light source, and sampling need to be performed on the shadow map during normal rendering to perform shadow calculation. When the scene complexity is relatively high, namely, there are a large number of objects and light sources, if shadow calculation of the entire scene is performed on the light sources one by one, a calculation amount is huge, and shadow rendering efficiency is affected, and if shadow calculation is performed through partial sampling, a phenomenon of edge aliasing may be easily generated, and a shadow rendering effect is affected.

Figure 2:
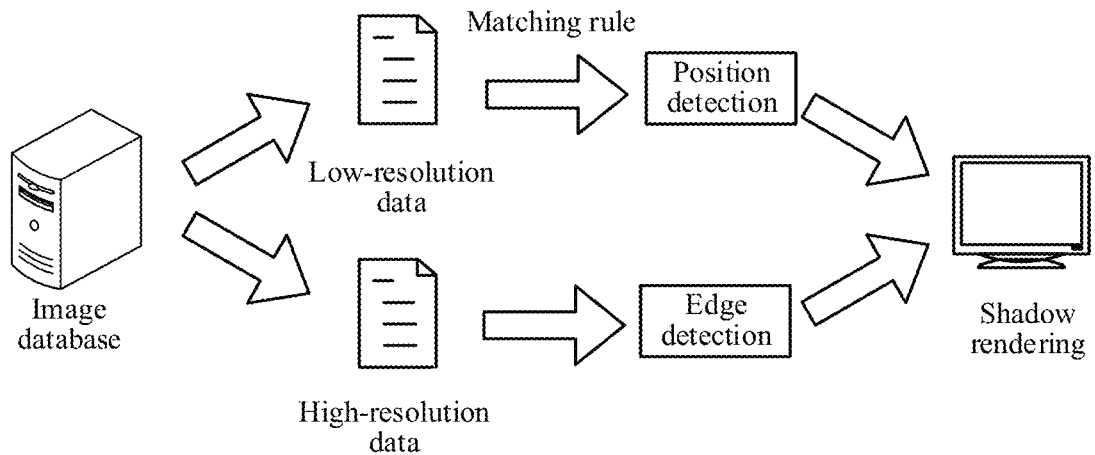
FIG. 2 is an architectural flowchart of image rendering according to an embodiment of the disclosure.

To resolve the foregoing problems, the disclosure provides an image rendering method, applicable to an image rendering flowchart architecture shown in FIG. 2. FIG. 2 is an architectural flowchart of image rendering according to an embodiment of the disclosure. High-resolution shadow data (for example, a high-resolution shadow map) and low-resolution shadow data (for example, a low-resolution shadow map) for a target virtual object are first obtained from an image database, a shadow rendering position of the target virtual object is determined by using the low-resolution shadow data, and a shadow edge of the target virtual object is then optimized by using the high-resolution shadow data, thereby implementing image rendering optimization of the target virtual object.

It may be understood that, the method provided in the disclosure may be writing of a program to serve as processing logic in a hardware system, or may serve as an image rendering apparatus implementing the foregoing processing logic through integration or external connection. As an example embodiment, the image rendering apparatus obtains a first shadow map and a second shadow map of a target virtual object, where a resolution of the first shadow map is less than a resolution of the second shadow map; determines a first texel range of each texel and a central point in the first shadow map; and performs scaling processing, based on the central point, on the first texel range by using a scaling coefficient, to obtain a second texel range, and further performs shadow rendering on the target virtual object according to the second texel range. In this way, a shadow map-based image rendering process is implemented, and since a calculation amount of determining a map position according to a low-resolution map is relatively small, image rendering efficiency is improved. A high-resolution shadow map is then rendered based on the position, thereby ensuring the definition of a shadow, avoiding generation of edge aliasing, and improving an image rendering effect.

Figure 3:
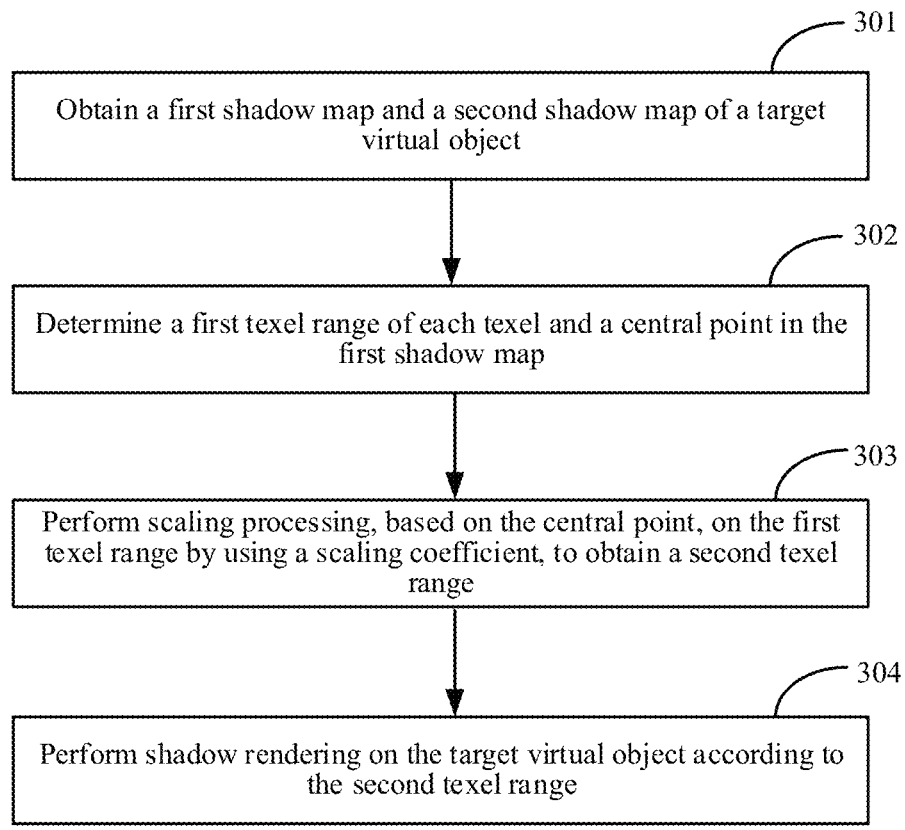
FIG. 3 is a flowchart of an image rendering method according to an embodiment of the disclosure.

The image rendering method in the disclosure is described below in combination with the flowchart architecture. FIG. 3 is a flowchart of an image rendering method according to an embodiment of the disclosure, and the method at least includes the following operations:

301: Obtain a first shadow map and a second shadow map of a target virtual object.

In this embodiment, a resolution of the first shadow map is less than a resolution of the second shadow map. For example, the resolution of the first shadow map is 32*32, and the resolution of the second shadow map is 128*128. Therefore, a shadow position is determined based on the first shadow map with a relatively low resolution, and rendering on a shadow edge is then performed at the shadow position based on the second shadow map with a high resolution. The determination of a position by using a low-resolution map has a small data processing amount, thereby avoiding occupation of a large amount of data processing resources. The optimization of the shadow edge is performed by using a high-resolution map, thereby avoiding a problem of edge aliasing easily caused by a low-resolution map, and improving a shadow rendering effect. For example, in an actual scene, the resolution of the first shadow map is far less than that of the second shadow map, where a width and a height of a high-resolution map are generally 10 times of that of a low-resolution map, so that a data processing amount may be greatly reduced by obtaining shadow maps with different resolutions, and a shadow rendering effect is ensured.

It may be understood that, the first shadow map may be obtained by the second shadow map through distance field (DF) conversion. That is, a low-resolution shadow map is obtained through conversion based on code of a high-resolution shadow map, for example, the low-resolution shadow map is obtained by performing downsampling on the code of the high-resolution shadow map. In addition, the first shadow map and the second shadow map may also be obtained through ray tracing respectively, and a specific manner is determined according to an actual scene. Since maps with different resolutions are associated with each other, conversion may be performed by using DF code, thereby improving the flexibility of shadow rendering.

To achieve an effect of expressing a high resolution by using low-resolution data, in an actual scene, there may be a specific multiple relationship between the resolution of the first shadow map and the resolution of the second shadow map, namely, a scaling coefficient. For example, a ratio of the resolution of the second shadow map to the resolution of the first shadow map is 4, namely, the scaling coefficient is 4.

It may be understood that, the foregoing data is merely exemplary, the shadow map is a data format, and other processes of using low-resolution data to position and partially or entirely using high-resolution data to render a target interface are also applicable to the embodiments of the disclosure.

302: Determine a first texel range of each texel and a central point in the first shadow map.

In this embodiment, the first texel range is set based on a transition distance of the shadow edge, and the transition distance is used for indicating a shadow edge of a target virtual object in the first shadow map.

Figure 4:
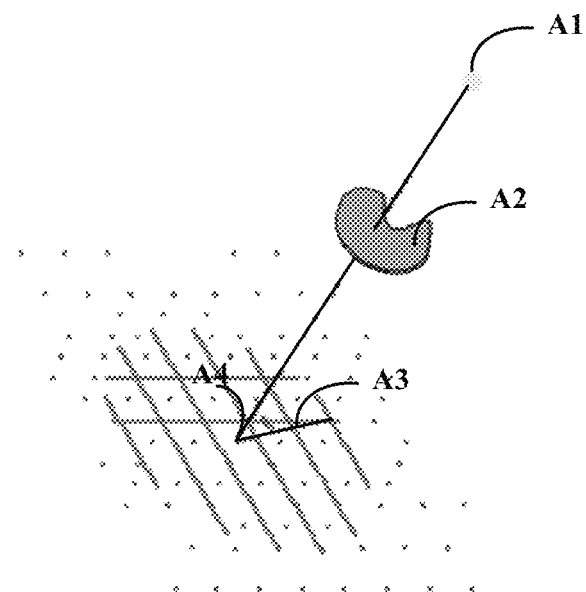
FIG. 4 is a schematic scene diagram of an image rendering method according to an embodiment of the disclosure.

For determination of the first texel range, reference may be made to FIG. 4. FIG. 4 is a schematic scene diagram of an image rendering method according to an embodiment of the disclosure. In the figure, each texel emits a ray to a light source A1 to pass through a virtual object A2, so as to calculate a shadow value to determine an edge of a shadow, and a DF range A3 is then calculated by using distances among texels, namely, texels in the shadow are determined, and a central point A4 of the range then may be determined based on the DF range.

Specifically, for calculation of the shadow value, each texel emits a ray to the light source, if light intersects with an object, the object is located in a shadow, and a shadow value is 0; and if light does not intersect with the object, the shadow value is 1. In a case that the shadow edge may include penumbra, the shadow value is within 0 and 1.

In addition, for determining of the DF range, considering that in a DF shadow map calculation of a distance value of each texel to the shadow edge may bring huge calculation overheads, during actual calculation, a transition distance of the shadow edge may be set. When a distance from a texel to the shadow edge is greater than the value, it indicates that the object is not located at the shadow edge already, and there is no need to calculate a DF value of the shadow.

It may be understood that, the transition distance may be a manually preset parameter, and a person may generally change the transition distance based on a scene style to be expressed; the transition distance may be alternatively determined according to a value in historical data of image rendering; and the transition distance may be alternatively adjusted according to a current scene, for example, when an interface scene changes from a sunny day to nightfall, an effect of a relatively long shadow needs to be shown, and the transition distance may be increased.

Specifically, in shadow map-based image rendering, elements in a shadow DF need to be calculated and encoded. An absolute distance from a texel central point to a nearest shadow edge is first calculated, where if the texel is located in a shadow, a signed distance is less than 0 and is an additive inverse of the absolute distance; and the signed distance is then normalized to be within 0 and 1 through the following method.

Specifically, this method may be performed according to the following formulas:

$$clampedDistance = \text{clamp}\left(\frac{signedDistance}{TransitionDistance}, 0.0, 1.0\right)$$

$$normalizedDistance = 0.5 * clampedDistance + 0.5$$

clampedDistance is the absolute distance from the texel central point to the nearest shadow edge; signedDistance is the signed distance; TransitionDistance is the transition distance; and normalizedDistance is the normalized distance. After normalization, if the normalized distance is 0, it indicates a maximum distance located in the shadow range, if the normalized distance is 1, it indicates a maximum distance located outside the shadow range, and if the normalized distance is 0.5, it is an edge of the shadow.

303: Perform scaling processing, based on the central point, on the first texel range by using a scaling coefficient, to obtain a second texel range.

In this embodiment, the scaling coefficient is obtained based on the ratio of the resolution of the first shadow map to the resolution of the second shadow map.

Specifically, the second texel range may be determined as covering the entire first texel range, namely, the first shadow map is completely replaced with the second shadow map. Due to the correspondence between texels in the second texel range and the second shadow map, the second shadow map may be conveniently generated in the interface, to implement an image rendering process of a virtual object.

During actual application, considering that a resolution of a high-resolution map (the second shadow map) is generally 10 times of width and height of a resolution of a low-resolution map (the first shadow map), namely, data magnitude of the high-resolution map is 100 times of that of the low-resolution map, directly generating the second shadow map may occupy a large amount of video memory, thereby affecting the stability of a rendering process. Therefore, edge rendering method may be used, namely, only the shadow edge is rendered as an edge part of the second shadow map, to resolve the problem that the edge of the first shadow map may generate aliasing. Specifically, a distance set of the central point to texel points in the second texel range are obtained; a texel point meeting an extraction condition such as a minimum distance in the distance set is then extracted to determine an edge distance; and a shadow edge region of the target virtual object is further determined according to the edge distance. Obtaining the shadow edge region may reduce a video memory occupation rate in a rendering process and improve the stability of the rendering process.

Figure 5:
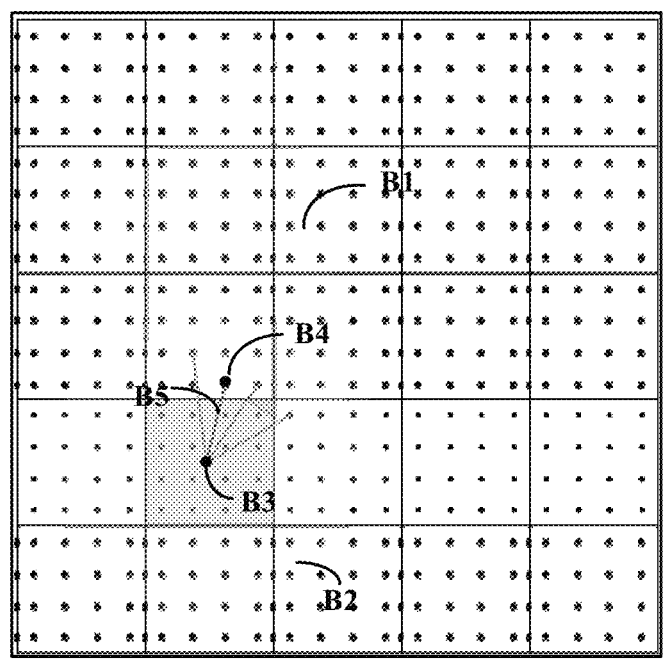
FIG. 5 is a schematic scene diagram of another image rendering method according to an embodiment of the disclosure.

In addition, considering that the shadow edge region generally appears near pixels covered by the virtual object. FIG. 5 is a schematic scene diagram of another image rendering method according to an embodiment of the disclosure, the figure includes a pixel B1 covered by the virtual object, a second texel range B2, a central point B3(O), a texel B4(P) covered by the pixel covered by the virtual object, and a minimum distance B5, and the second texel range is obtained according to the central point B3 of the first texel range, the first texel range, and a scaling coefficient S. The second texel range P is then calculated one by one, if shadow values of the texel P and the central point O are different, a distance between P and O in a world space is calculated, and the minimum distance is updated, to further determine the shadow edge region according to a connecting line of the minimum distance.

Specifically, the second texel range may be calculated through the following formula:

$$R_2 = (2R_1 + 1)*S$$

$R_2$ is the second texel range, $R_1$ is the first texel range, and S is the scaling coefficient.

For the distance between P and O in the world space, reference may be made to the following formula:

$$d = \sqrt{(x_1-x_2)^2 + (y_1-y_2)^2}$$

d is the distance between P and O in the world space, x1 and y1 are a horizontal coordinate and a longitudinal coordinate of O, and x2 and y2 are a horizontal coordinate and a longitudinal coordinate of P.

By performing further shadow edge optimization based on the pixel covered by the virtual object, determination of the shadow edge region is more accurate, thereby ensuring the accurate generation of a high-resolution map at the shadow edge and improving the accuracy of image rendering.

304: Perform shadow rendering on the target virtual object according to the second texel range.

In this embodiment, generation of the second shadow map is performed based on the second texel range determined in operations 303, where the entire second shadow map may be inserted, or the second shadow map is inserted after the shadow edge region is determined.

Since there are relatively more texel points in the second texel range, a large number of texel points need to be processed correspondingly in a rendering process, and a data amount is relatively large. Therefore, the texel points in the second texel range may be mapped with texel points in the first texel range according to position information. That is, one of the texel points in the first texel range corresponds to a plurality of texel points in the second texel range, and rendering is performed based on the texel points in the first texel range, to reduce a data processing amount. Specifically, the texel points in the second texel range are first mapped into a texel point in the corresponding first texel range to generate an association texel, the association texel being used for indicating a correspondence between one of the texel points in the first texel range and a plurality of texel points in the second texel range; DF values in the association texel are then determined respectively; and shadow rendering is further performed based on the DF values. For example, if there are 9 texel points in the second texel range and the scaling coefficient is 3, the 9 texel points may correspond to a calculation process of a DF of 1 texel point in the first texel range, so as to reduce the data processing amount.

To ensure the accuracy of the rendering process, the foregoing mapping process may be performed through a plurality of iterations, namely, a plurality of times of mapping is performed, to perform shadow rendering on a minimum value of the DF values in the second texel range, thereby improving the accuracy of the mapping process.

Figure 6:
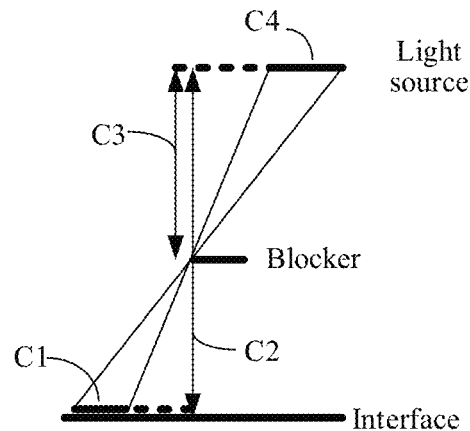
FIG. 6 is a schematic scene diagram of another image rendering method according to an embodiment of the disclosure.

A light source in a target virtual scene is generally not a fixed point, and the light source may be in a specific shape. In this case, penumbra may be generated easily, so that after the second shadow map is rendered as the second texel range, further optimization may be performed on the rendering process based on the penumbra. Specifically, shape information of the light source is first obtained; a penumbra parameter is than determined according to the shape information and the second texel range; and shadow rendering is further performed on the target virtual object based on the penumbra parameter. FIG. 6 is a schematic scene diagram of another image rendering method according to an embodiment of the disclosure. The figure shows parameters involved in a calculation process of a region corresponding to the penumbra parameter, and a specific formula is as follows:

$$W_{Penumbra} = \frac{(d_{Receiver} - d_{Blocker})}{d_{Blocker}} * W_{Light}$$

$W_{Penumbra}$ is a penumbra region C1; $d_{Receiver}$ is a distance C2 from a light source to an interface; $d_{Blocker}$ is a distance C3 from the light source to a blocker, namely, a distance from the light source to the virtual object; and $W_{Light}$ is a shape parameter C4 of the light source.

The penumbra parameter is further determined according to a ratio of the penumbra region C1 to the shape parameter C4 of the light source, and further rendering is performed on the shadow map to improve a rendering effect.

As can be known from the foregoing embodiment, a first shadow map and a second shadow map of a target virtual object are obtained, a resolution of the first shadow map being less than a resolution of the second shadow map; a first texel range of each texel and a central point in the first shadow map are determined; and scaling processing is performed, based on the central point, on the first texel range by using a scaling coefficient, to obtain a second texel range, and shadow rendering is further performed on the target virtual object according to the second texel range. In this way, a shadow map-based image rendering process is implemented, and since a calculation amount of determining a map position according to a low-resolution map is relatively small, image rendering efficiency is improved. A high-resolution shadow map is then rendered based on the position, thereby ensuring the definition of a shadow, avoiding generation of edge aliasing, and improving an image rendering effect.

The foregoing embodiment describes an image rendering process, and the process is a main function of Unreal Engine (UE). In UE, a DF shadow map needs to be generated by a central processing unit (CPU) through offline baking. Different from determining whether an object in which a shadow map obtained through normal baking is directly stored is in a shadow, each texel of the DF shadow map includes two parts of data, namely, a distance from a central point of the texel to a shadow edge in a world space and a shadow value of the texel. To calculate the distance from the central point of the texel to the shadow edge, an edge of a high-resolution shadow needs to be calculated through a ray tracing technology, a distance from each texel to the shadow edge is than calculated, and a DF is encoded and stored by using a preset edge transition distance.

However, the DF shadow map is calculated by using the CPU, during baking, a calculation load of the CPU is high, which affects the stability of the rendering process.

Figure 7:
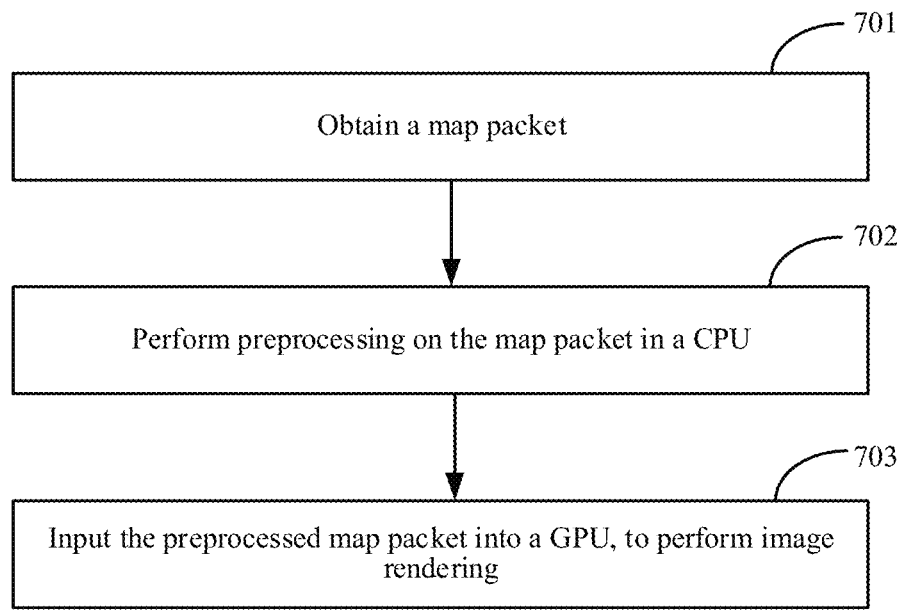
FIG. 7 is a flowchart of another image rendering method according to an embodiment of the disclosure.

To resolve the foregoing problem, the following describes a specific rendering process. FIG. 7 is a flowchart of another image rendering method according to an embodiment of the disclosure, and the method includes the following operations:

701: Obtain a map packet.

In this embodiment, the map packet is used for indicating shadow rendering of a target virtual object, the map packet may include shadow maps under at least two resolutions, and the shadow maps may be selected by using a resolution of a specific scaling coefficient, for ease of invocation in a rendering process.

702: Perform preprocessing on the map packet in a CPU.

In this embodiment, for ease of subsequent multi-thread processing of a graphics processing unit (GPU), preprocessing may be performed on the map packet in the CPU.

Specifically, the target virtual object may be rasterized by using the CPU to obtain a plurality of target patches, and the target patch is used for indicating a position of a shadow region, thereby ensuring the accuracy of a shadow value in a ray tracing process.

Coordinate systems in different virtual scenes may be different, so that scene information in the map packet may be parsed by using the CPU; and the shadow maps under at least two resolutions are then converted into the same coordinate system according to the scene information.

703: Input the preprocessed map packet into a GPU, to perform image rendering.

In this embodiment, a processing process of the GPU on the preprocessed map packet is mainly performed based on Optix and Cuda platforms. Based on a programming application program interface (API) provided by CUDA, parallel acceleration may be performed on shadow calculation on the GPU by using parallel units, namely, the foregoing iterative calculation process in the embodiment shown in FIG. 3.

Based on a ray tracing framework in Optix, a ray tracing core of the GPU is used to upload a scene into the GPU, and hardware acceleration may be performed on ray tracing, to greatly improve the efficiency of ray tracing.

According to the foregoing embodiment, the DF shadow map baking method based on GPU iterations includes a characteristic that calculation among texels is mutually independent, which is suitable for a concurrency characteristic of the GPU, thereby greatly improving DF shadow baking performance. Based on different scene complexities and map resolutions, a DF shadow baking time of a single object is 100 ms to 1 s. In addition, the entire CPU may be prevented from being in a full-load busy state, that is, CPU calculation may be transferred into the GPU, to greatly reduce CPU utilization.

Further, a map packet of each object is independent, so that a rendering manner in which objects are rendered one by one can improve a response speed of a baking system, thereby improving development efficiency. The baking system based on the GPU can reduce the CPU utilization, and DF shadow maps stored in the GPU can directly transmit data to a game scene by using CUDA, which is more suitable for shadow baking of the game scene.

Figure 8:
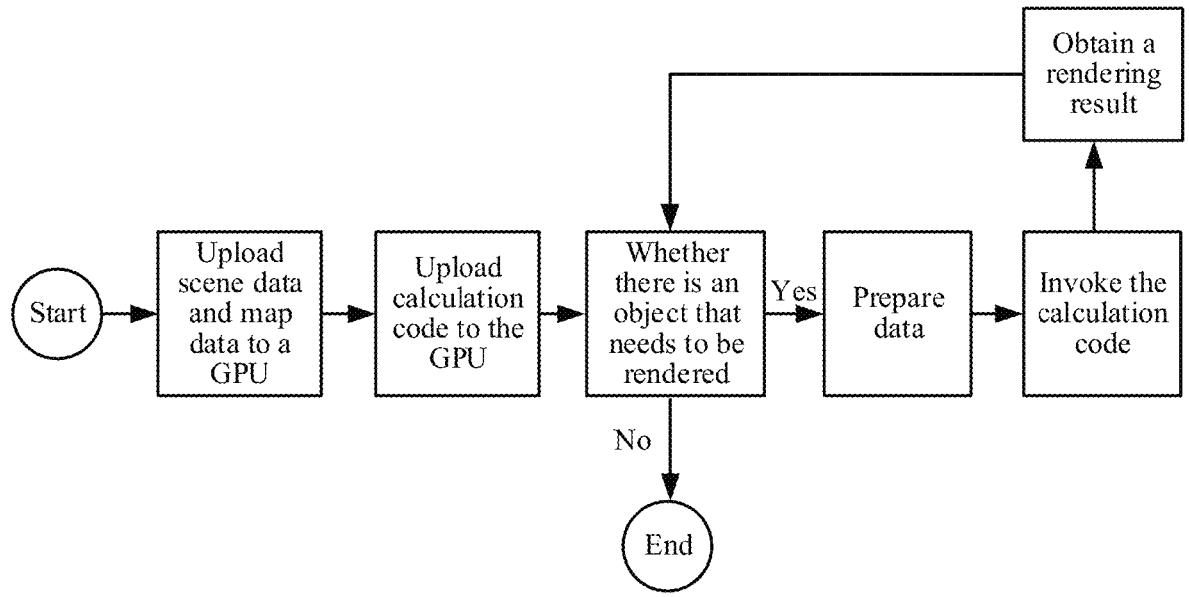
FIG. 8 is a flowchart of another image rendering method according to an embodiment of the disclosure.

The following describes the foregoing image rendering method with reference to a specific process. FIG. 8 is a flowchart of another image rendering method according to an embodiment of the disclosure, first, for rendering of a DF shadow map of a single object, a CPU needs to prepare buffer data of at least two resolutions, and each texel in the buffers of at least two resolutions needs to store a position under a world coordinate system. A high-resolution buffer is mainly used for calculating whether the texel is in a shadow, so as to determine a high-resolution shadow edge. A low-resolution buffer is mainly used for calculating a distance from a texel center to the shadow edge, for ease of rendering of the high-resolution buffer. In addition, the CPU stores mesh data of objects and light map coordinates of each mesh vertex, to prepare the foregoing data, the CPU needs to rasterize the mesh data of the objects, to write spatial positions and identifiers whether texels are mapped into the buffers.

The scene data and the map data are then uploaded to the GPU, to determine a mapping relationship among the texels. For example, for texels not mapped into the objects, such texels do not require neither shadow calculation nor DF value calculation, and identifying these pixels by using an identifier bit can reduce unnecessary calculation overheads.

Figure 9:
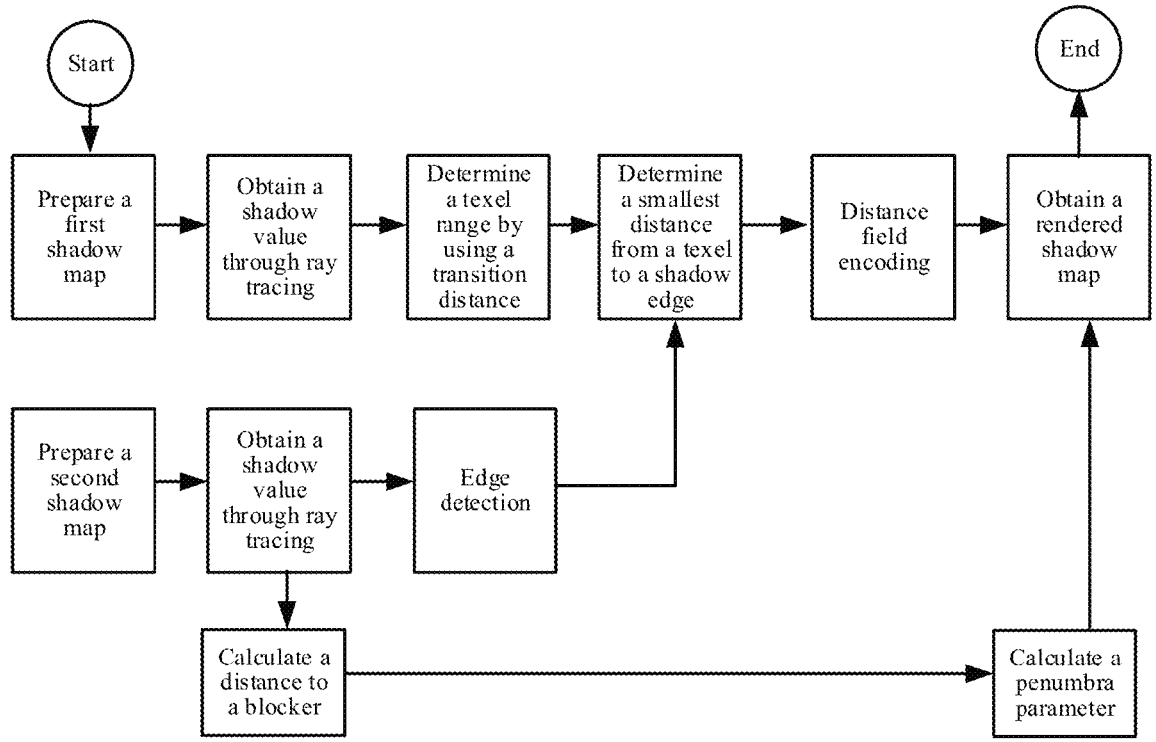
FIG. 9 is a flowchart of another image rendering method according to an embodiment of the disclosure.
Figure 10:
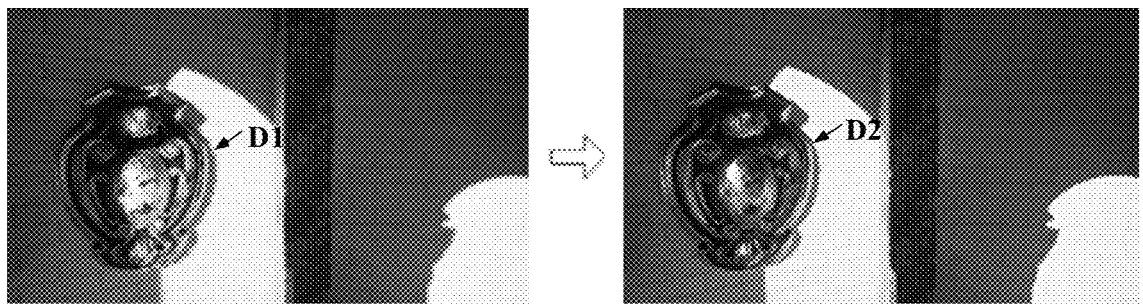
FIG. 10 is a schematic scene diagram of another image rendering method according to an embodiment of the disclosure.

Further, whether there is an object in an interface needs to be rendered is determined, and if there is an object needs to be rendered, related data is invoked, and the image rendering process described in FIG. 9 is invoked to obtain a rendering result. FIG. 9 is a flowchart of another image rendering method according to an embodiment of the disclosure. After a rendering process is started, ray tracing is performed on a first shadow map and a second shadow map that are prepared respectively to determine shadow values. Further, a texel range of the first shadow map is determined by using a transition distance, and edge detection is performed on the second shadow map to determine a smallest distance from a texel to a shadow edge. A part of the second shadow map in a shadow is rendered, to further perform DF encoding, to adjust the part of the second shadow map to a shadow image corresponding to the encoding. In addition, after ray tracing is performed on the second shadow map, a distance from an interface to a blocker may be further calculated to calculate a penumbra parameter, and the rendered shadow map is further rendered, thereby implementing a GPU-based image rendering process. CPU utilization is reduced, and normal running of a rendering process is ensured. Additionally, a case of edge aliasing of a shadow map is reduced, and a rendering effect is improved. FIG. 10 is a schematic scene diagram of another image rendering method according to an embodiment of the disclosure. In the figure, a shadow edge D1 presents a case of aliasing, a shadow edge D2 is obtained through the foregoing process, and as can be seen, the aliasing of the shadow edge apparently disappears after the foregoing process is used.

Figure 11:
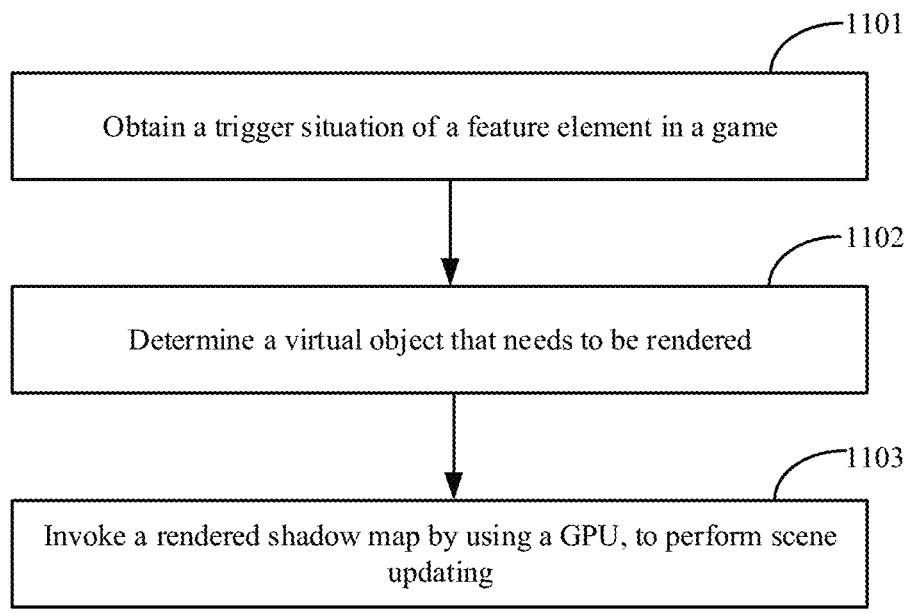
FIG. 11 is a flowchart of another image rendering method according to an embodiment of the disclosure.

The image rendering method in this embodiment may be applicable to an image rendering process of a game, and the image rendering method is described below with reference to the specific game scene. FIG. 11 is a flowchart of another image rendering method according to an embodiment of the disclosure. The method includes the following operations:

1101: Obtain a trigger situation of a feature element in a game.

The feature element may be a button starting shadow display or determination of a specific threshold. For example, the feature element indicates an angle between a virtual object of a gamer and a light source in a game interface, and if the angle is greater than 30 degrees, the feature element is regarded as being triggered, and an image rendering process is invoked.

1102: Determine a virtual object that needs to be rendered.

The virtual object may be at least one of a virtual building, a virtual plant, a virtual terrain, a virtual character, a virtual furniture, a virtual vehicle, or a virtual animal/pet.

Specifically, the virtual object that needs to be rendered is a virtual object having a shadow effect in the game interface, such as a character controlled by the gamer.

1103: Invoke a rendered shadow map by using a GPU to perform scene updating.

For the image rendering process, reference may be made to the method described in FIG. 3 or FIG. 7, and details are not described herein again.

Figure 12:
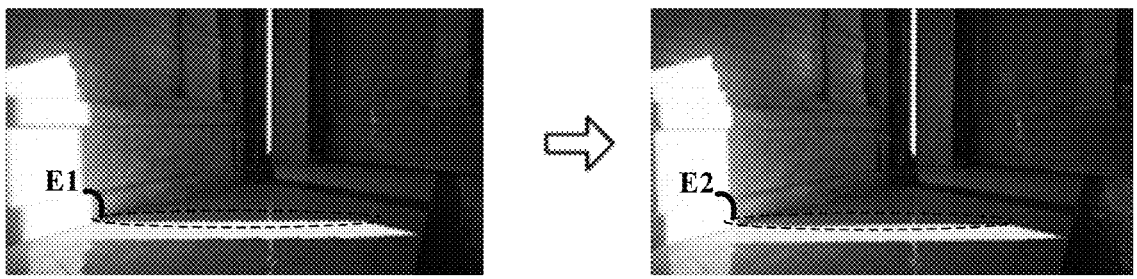
FIG. 12 is a schematic scene diagram of another image rendering method according to an embodiment of the disclosure.

Specifically, FIG. 12 is a schematic scene diagram of another image rendering method according to an embodiment of the disclosure. In the figure, a shadow edge E1 presents a case of aliasing, a shadow edge E2 is obtained through the foregoing process, and as can be seen, the aliasing of the shadow edge apparently disappears after the foregoing image rendering process is used.

Image rendering is performed on the virtual object in the game scene, so that a three-dimensional effect in a game process in enhanced especially in a three-dimensional game, thereby improving the richness of the game scene and improving user experience.

Figure 13:
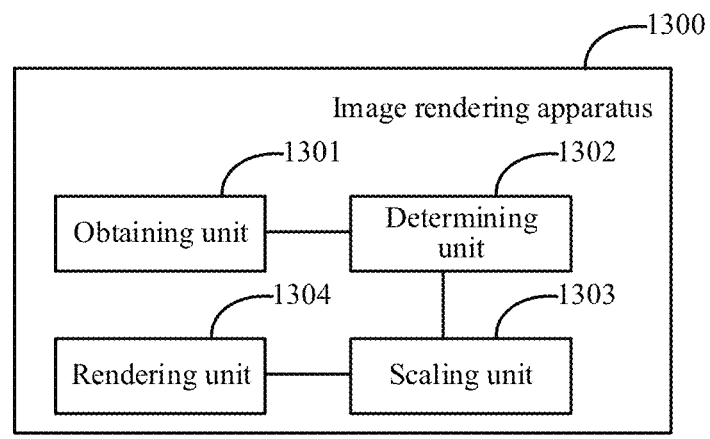
FIG. 13 is a schematic structural diagram of an image rendering apparatus according to an embodiment of the disclosure.

To better implement the foregoing solutions of the embodiments of the disclosure, related apparatuses for implementing the foregoing solutions are further provided below. FIG. 13 is a schematic structural diagram of an image rendering apparatus according to an embodiment of the disclosure. The image rendering apparatus 1300 includes:

an obtaining unit 1301, configured to obtain a first shadow map and a second shadow map of a target virtual object, a resolution of the first shadow map being less than a resolution of the second shadow map;

a determining unit 1302, configured to determine a first texel range of each texel and a central point in the first shadow map, the first texel range being set based on a transition distance of a shadow edge, and the transition distance being used for indicating a shadow edge of the target virtual object in the first shadow map;

a scaling unit 1303, configured to perform, based on the central point, scaling processing on the first texel range by using a scaling coefficient, to obtain a second texel range, the scaling coefficient being obtained based on a ratio of the resolution of the first shadow map to the resolution of the second shadow map; and a rendering unit 1304, configured to perform shadow rendering on the target virtual object according to the second texel range.

In some example embodiments of the disclosure, the scaling unit 1303 is further configured to obtain a distance set of the central point to texel points in the second texel range;

the scaling unit 1303 is further configured to extract a texel point meeting an extraction condition from the distance set to determine an edge distance;

the scaling unit 1303 is further configured to determine a shadow edge region of the target virtual object according to the edge distance; and the rendering unit 1304 is specifically configured to render a corresponding part of the second shadow map based on the shadow edge region, to perform shadow rendering on the target virtual object.

In some example embodiments of the disclosure, the scaling unit 1303 is specifically configured to determine a first shadow value of the first shadow map, the first shadow value being determined based on an intersection situation of a first ray and the target virtual object, and the first ray being used for indicating a connecting line between the first shadow map and a light source;

the scaling unit 1303 is specifically configured to determine a second shadow value of the second shadow map, the second shadow value being determined based on an intersection situation of a second ray and the target virtual object, and the second ray being used for indicating a connecting line between the second shadow map and the light source; and the scaling unit 1303 is specifically configured to obtain the distance set of the central point to the texel points in the second texel range in a case that the first shadow value and the second shadow value are different.

In some example embodiments of the disclosure, the scaling unit 1303 is specifically configured to determine texel points covered by pixels occupied by the target virtual object in the second texel range; and the scaling unit 1303 is specifically configured to determine the distance set according to the texel points covered by the pixels.

In some example embodiments of the disclosure, the rendering unit 1304 is specifically configured to map texel points in the second texel range into a texel point in the corresponding first texel range to generate an association texel, the association texel being used for indicating a correspondence between one of the texel points in the first texel range and a plurality of texel points in the second texel range;

the rendering unit 1304 is specifically configured to determine distance field (DF) values in the association texel respectively; and the rendering unit 1304 is specifically configured to perform shadow rendering based on the DF values.

In some example embodiments of the disclosure, the rendering unit 1304 is specifically configured to perform iterative calculation based on the DF values, to determine a change situation of the DF values;

the rendering unit 1304 is specifically configured to determine a minimum value of the DF values based on the change situation of the DF values; and the rendering unit 1304 is specifically configured to perform shadow rendering based on the minimum value of the DF values.

In some example embodiments of the disclosure, the rendering unit 1304 is further configured to obtain shape information of a light source;

the rendering unit 1304 is specifically configured to determine a penumbra parameter according to the shape information and the second texel range; and the rendering unit 1304 is specifically configured to perform shadow rendering on the target virtual object based on the penumbra parameter.

A first shadow map and a second shadow map of a target virtual object are obtained, where a resolution of the first shadow map is less than a resolution of the second shadow map; a first texel range of each texel and a central point in the first shadow map are determined; and scaling processing is performed, based on the central point, on the first texel range by using a scaling coefficient, to obtain a second texel range, and shadow rendering is further performed on the target virtual object according to the second texel range. In this way, a shadow map-based image rendering process is implemented, and since a calculation amount of determining a map position according to a low-resolution map is relatively small, image rendering efficiency is improved. A high-resolution shadow map is then rendered based on the position, thereby ensuring the definition of a shadow, avoiding generation of edge aliasing, and improving an image rendering effect.

Figure 14:
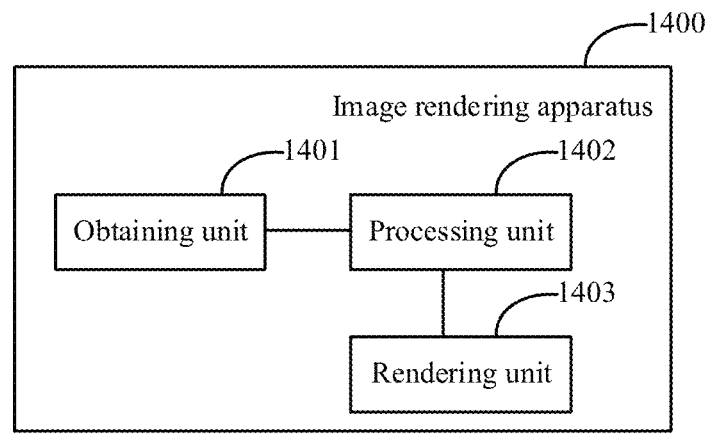
FIG. 14 is a schematic structural diagram of another image rendering apparatus according to an embodiment of the disclosure.

An embodiment of the disclosure further provides another image rendering apparatus 1400. FIG. 14 is a schematic structural diagram of another image rendering apparatus according to an embodiment of the disclosure. The apparatus includes: an obtaining unit 1401, configured to obtain a map packet, the map packet being used for indicating shadow rendering of a target virtual object;

a processing unit 1402, configured to perform preprocessing on the map packet in a central processing unit (CPU); and a rendering unit 1403, configured to input the preprocessed map packet into a graphics processing unit (GPU), to perform the image rendering method according to the first aspect or any example embodiment of the first aspect.

In some example embodiments of the disclosure, the processing unit 1402 is specifically configured to parse scene information in the map packet by using the CPU; and the processing unit 1402 is specifically configured to convert the shadow maps under at least two resolutions into a same coordinate system according to the scene information.

Additionally, in some example embodiments of the disclosure, the processing unit 1402 is specifically configured to rasterize the target virtual object by using the CPU to obtain a plurality of target patches, the target patch being used for indicating a position of a shadow region.

Figure 15:
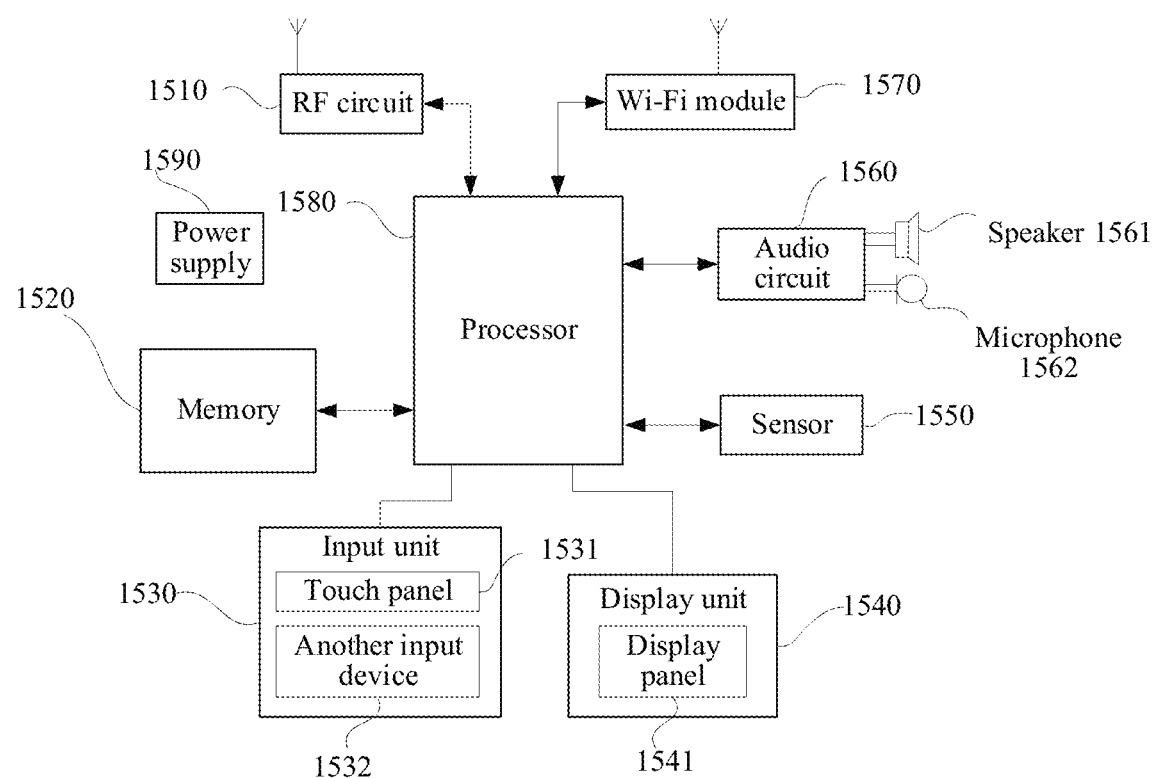
FIG. 15 is a schematic structural diagram of a terminal device according to an embodiment of the disclosure.

An embodiment of the disclosure further provides a terminal device. FIG. 15 is a schematic structural diagram of a terminal device according to an embodiment of the disclosure. For ease of description, only parts related to the embodiments of the disclosure are shown. For specific technical details that are not disclosed, refer to the method part in the embodiments of the disclosure. The terminal device may be any terminal device including a mobile phone, a tablet computer, a personal digital assistant (PDA), a point of sales (POS), and an on-board computer. In an example, the terminal device is a mobile phone.

FIG. 15 shows a block diagram of a partial structure of a mobile phone related to the terminal device according to this embodiment of the disclosure. Referring to FIG. 15, the mobile phone includes components such as: a radio frequency (RF) circuit 1510, a memory 1520, an input unit 1530, a display unit 1540, a sensor 1550, an audio circuit 1560, a wireless fidelity (Wi-Fi) module 1570, a processor 1580, and a power supply 1590. A person skilled in the art may understand that the structure of the mobile phone shown in FIG. 15 does not constitute a limitation on the mobile phone, and the mobile phone may include more components or fewer components than those shown in the figure, or some components may be combined, or a different component deployment may be used.

The following makes a specific description of components of the mobile phone with reference to FIG. 15.

The RF circuit 1510 may be configured to receive and send a signal in an information receiving and sending process or a call process, and in particular, after downlink information of a base station is received, send the downlink information to the processor 1580 for processing. In addition, the RF circuit transmits uplink data to the base station. Generally, the RF circuit 1510 includes, but is not limited to, an antenna, at least one amplifier, a transceiver, a coupler, a low noise amplifier (LNA), and a duplexer. In addition, the RF circuit 1510 may also communicate with a network and another device through wireless communication. The wireless communication may use any communication standard or protocol, including but not limited to Global System for Mobile Communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 1520 may be configured to store a software program and module. The processor 1580 runs the software program and module stored in the memory 1520, to implement various functional applications and data processing of the mobile phone. The memory 1520 may mainly include a program storage area and a data storage area. The program storage area may store an operating system, an application program required by at least one function (for example, a sound playback function and an image playback function), or the like. The data storage area may store data (for example, audio data and a phone book) created according to use of the mobile phone. In addition, the memory 1520 may include a high-speed random access memory, and may further include a non-volatile memory, such as at least one magnetic disk storage device, a flash memory, or another volatile solid-state storage device.

The input unit 1530 may be configured to receive inputted digit or character information, and generate a keyboard signal input related to the user setting and function control of the mobile phone. Specifically, the input unit 1530 may include a touch panel 1531 and another input device 1532. The touch panel 1531, also referred to as a touchscreen, may collect a touch operation of a user on or near the touch panel (for example, an operation of a user on the touch panel 1531 or near the touch panel 1531 by using any suitable object or accessory such as a finger or a stylus, and an in-air touch operation within a specific range of the touch panel 1531), and drive a corresponding connection apparatus according to a preset program. The touch panel 1531 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into a contact coordinate, then transmits the contact coordinate to the processor 1580, and receives and executes a command transmitted by the processor 1580. In addition, the touch panel 1531 may be implemented by using various types, such as a resistive type, a capacitive type, an infrared type, and a surface acoustic wave type. In addition to the touch panel 1531, the input unit 1530 may further include the another input device 1532. Specifically, the another input device 1532 may include, but is not limited to, one or more of a physical keyboard, a functional key (such as a volume control key or a switch key), a track ball, a mouse, and a joystick.

The display unit 1540 may be configured to display information inputted by the user or information provided for the user, and various menus of the mobile phone. The display unit 1540 may include a display panel 1541. The display panel 1541 may be configured by using a liquid crystal display (LCD), an organic light-emitting diode (OLED), or the like. Further, the touch panel 1531 may cover the display panel 1541. After detecting a touch operation on or near the touch panel, the touch panel 1531 transfers the touch operation to the processor 1580, to determine a type of a touch event. Then, the processor 1580 provides a corresponding visual output on the display panel 1541 according to the type of the touch event. Although in FIG. 15, the touch panel 1531 and the display panel 1541 are used as two separate parts to implement input and output functions of the mobile phone, in some embodiments, the touch panel 1531 and the display panel 1541 may be integrated to implement the input and output functions of the mobile phone.

The mobile phone may further include at least one sensor 1550 such as an optical sensor, a motion sensor, and other sensors. Specifically, the optical sensor may include an ambient light sensor and a proximity sensor. The ambient light sensor may adjust luminance of the display panel 1541 according to brightness of the ambient light. The proximity sensor may switch off the display panel 1541 and/or backlight when the mobile phone is moved to the ear. As one type of motion sensor, an acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 1560, a speaker 1561, and a microphone 1562 may provide audio interfaces between the user and the mobile phone. The audio circuit 1560 may transmit, to the speaker 1561, an electrical signal obtained by converting received audio data, and the speaker 1561 converts the electrical signal into a voice signal for outputting. In addition, the microphone 1562 converts a collected sound signal into an electrical signal. After receiving the electrical signal, the audio circuit 1560 converts the electrical signal into audio data, and then outputs the audio data. After being processed by the processor 1580, the audio data is transmitted through the RF circuit 1510 to, for example, another mobile phone or the audio data is outputted to the memory 1520 for further processing.

Wi-Fi belongs to a short distance wireless transmission technology. The mobile phone may help, by using the Wi-Fi module 1570, a user to receive and transmit an email, browse a web page, access stream media, and the like. This provides wireless broadband Internet access for the user. Although FIG. 15 shows the Wi-Fi module 1570, the Wi-Fi module is not a necessary component of the mobile phone, and the Wi-Fi module may be omitted as required provided that the scope of the essence of the present disclosure is not changed.

The processor 1580 is a control center of the mobile phone, and is connected to various parts of the entire mobile phone by using various interfaces and lines. By running or executing a software program and/or module stored in the memory 1520, and invoking data stored in the memory 1520, the processor executes various functions of the mobile phone and performs data processing, thereby monitoring the entire mobile phone. The processor 1580 may include one or more processing units. Additionally, the processor 1580 may integrate an application processor and a modem processor, where the application processor mainly processes an operating system, a user interface, an application program, and the like, and the modem processor mainly processes wireless communication. It may be understood that the foregoing modem processor may either not be integrated into the processor 1580.

The mobile phone further includes the power supply 1590 (such as a battery) for supplying power to the components. The power supply may be logically connected to the processor 1580 by using a power management system, thereby implementing functions such as charging, discharging and power consumption management by using the power management system.

Although not shown in the figure, the mobile phone may further include a camera, a Bluetooth module, and the like, which are not further described herein.

In the embodiments of the disclosure, the processor 1580 included in the terminal device further has a function of performing various operations of the foregoing image rendering method.

Figure 16:
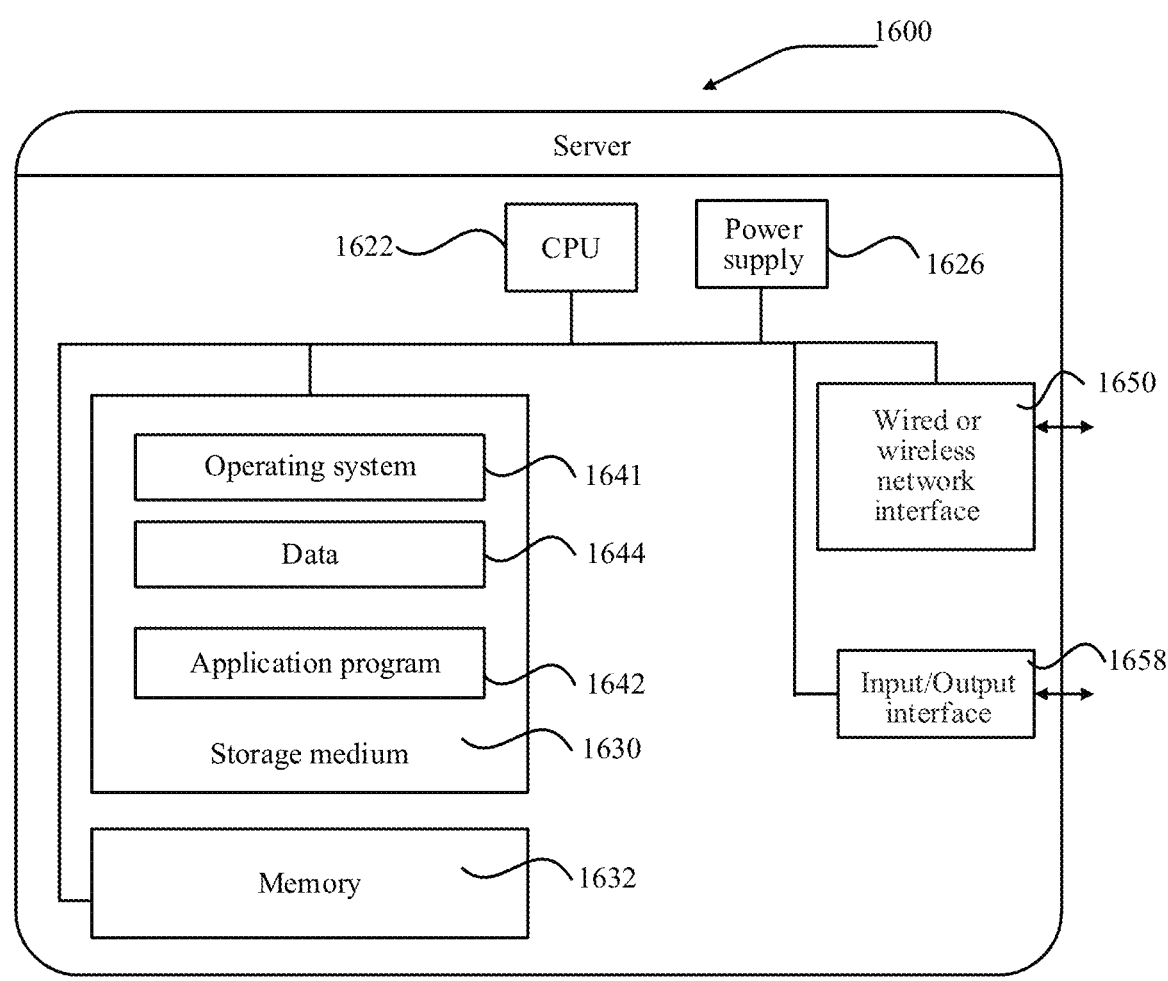
FIG. 16 is a schematic structural diagram of a server according to an embodiment of the disclosure.

An embodiment of the disclosure further provides a server. FIG. 16 is a schematic structural diagram of a server according to an embodiment of the disclosure. The server 1600 may vary greatly due to different configurations or performance, and may include one or more central processing units (CPU) 1622 (for example, one or more processors) and a memory 1632, and one or more storage media 1630 (for example, one or more mass storage devices) that store application programs 1642 or data 1644. The memory 1632 and the storage medium 1630 may implement transient storage or permanent storage. The programs stored in the storage media 1630 may include one or more modules (not shown in the figure), and each module may include a series of instruction operations to the server. Still further, the CPU 1622 may be configured to communicate with the storage medium 1630 to perform the series of instruction operations in the storage medium 1630 on the server 1600.

The server 1600 may further include one or more power supplies 1626, one or more wired or wireless network interfaces 1650, one or more input/output interfaces 1658, and/or, one or more operating systems 1641, for example, Windows Server™, Mac OS X™, Unix™, Linux™ and FreeBSD™.

The operations performed by the image rendering apparatus in the foregoing embodiments may be based on the server structure shown in FIG. 16.

An embodiment of the disclosure further provides a computer-readable storage medium, storing image rendering instructions, the image rendering instructions, when run on a computer, causing the computer to perform the operations performed by the image rendering apparatus in the method described according to embodiments of FIG. 2 to FIG. 12.

An embodiment of the disclosure further provides computer program product including image rendering instructions, the image rendering instructions, when run on a computer, causing the computer to perform the operations performed by the image rendering apparatus in the method described according to embodiments of FIG. 2 to FIG. 12.

An embodiment of the disclosure further provides an image rendering system, the image rendering system may include the image rendering apparatus in the embodiment according to FIG. 13 or the terminal device according to FIG. 15.

What is claimed is:

1. An image rendering method, performed by a terminal, the method comprising:
   obtaining a first shadow map and a second shadow map of a target virtual object, a resolution of the first shadow map being less than a resolution of the second shadow map;
   determining a first texel range of each texel and a central point in the first shadow map, the first texel range being set based on a transition distance of a shadow edge and the transition distance being used for indicating a shadow edge of the target virtual object in the first shadow map;
   performing, based on the central point, scaling processing on the first texel range by using a scaling coefficient to obtain a second texel range, the scaling coefficient being obtained based on a ratio of the resolution of the first shadow map to the resolution of the second shadow map; and
   performing shadow rendering on the target virtual object according to the second texel range.

2. The image rendering method according to claim 1, wherein after the performing, based on the central point, scaling processing on the first texel range the method further comprises:
   obtaining a distance set of the central point to texel points in the second texel range;
   extracting a texel point meeting an extraction condition from the distance set to determine an edge distance; and
   determining a shadow edge region of the target virtual object according to the edge distance; and
   the performing shadow rendering on the target virtual object according to the second texel range comprises:
   rendering a corresponding part of the second shadow map based on the shadow edge region to perform shadow rendering on the target virtual object.

3. The image rendering method according to claim 2, wherein the obtaining a distance set of the central point to texel points in the second texel range comprises:
   determining a first shadow value of the first shadow map, the first shadow value being determined based on an intersection situation of a first ray and the target virtual object, and the first ray being used for indicating a connecting line between the first shadow map and a light source;
   determining a second shadow value of the second shadow map, the second shadow value being determined based on an intersection situation of a second ray and the target virtual object, and the second ray being used for indicating a connecting line between the second shadow map and the light source; and
   obtaining the distance set of the central point to the texel points in the second texel range in a case that the first shadow value and the second shadow value are different.

4. The image rendering method according to claim 3, wherein the obtaining a distance set of the central point to texel points in the second texel range comprises:
   determining texel points covered by pixels occupied by the target virtual object in the second texel range; and
   determining the distance set according to the texel points covered by the pixels.

5. The image rendering method according to claim 1, wherein the performing shadow rendering on the target virtual object according to the second texel range comprises:
   mapping texel points in the second texel range into a texel point in the corresponding first texel range to generate an association texel, the association texel being used for indicating a correspondence between one of the texel points in the first texel range and a plurality of texel points in the second texel range;
   separately determining distance field values in the association texel; and
   performing shadow rendering based on the distance field values.

6. The method according to claim 5, wherein the performing shadow rendering based on the distance field values comprises:
   performing iterative calculation based on the distance field values, to determine a change situation of the distance field values;
   determining a minimum value of the distance field values based on the change situation of the distance field values; and
   performing shadow rendering based on the minimum value of the distance field values.

7. The image rendering method according to claim 1, wherein the performing shadow rendering on the target virtual object according to the second texel range comprises:
   obtaining shape information of the light source;
   determining a penumbra parameter according to the shape information and the second texel range; and
   performing shadow rendering on the target virtual object based on the penumbra parameter.

8. The method according to claim 1, wherein the target virtual object is a virtual object in a game.

9. The image rendering method according to claim 1, further comprising:
   obtaining a map packet, the map packet being used for indicating shadow rendering of a target virtual object, and the map packet comprising shadow maps under at least two resolutions;
   performing preprocessing on the map packet in a central processing unit (CPU); and
   inputting the preprocessed map packet into a graphics processing unit (GPU).

10. The image rendering method according to claim 9, wherein the performing preprocessing on the map packet in a CPU comprises:
    parsing scene information in the map packet by using the CPU; and
    converting the shadow maps under at least two resolutions into a same coordinate system according to the scene information.

11. The image rendering method according to claim 9, wherein the performing preprocessing on the map packet in a CPU comprises:
    rasterizing the target virtual object by using the CPU to obtain a plurality of target patches, the target patch being used for indicating a position of a shadow region.

12. An image rendering apparatus, comprising:
    at least one memory configured to store computer program code;
    at least one processor configured to operate as instructed by the computer program code, the computer program code including:

obtaining code configured to cause the at least one processor to obtain a first shadow map and a second shadow map of a target virtual object, a resolution of the first shadow map being less than a resolution of the second shadow map;

determining code configured to cause the at least one processor to determine a first texel range of each texel and a central point in the first shadow map, the first texel range being set based on a transition distance of a shadow edge, and the transition distance being used for indicating a shadow edge of the target virtual object in the first shadow map;

scaling code configured to cause the at least one processor to perform, based on the central point, scaling processing on the first texel range by using a scaling coefficient to obtain a second texel range, the scaling coefficient being obtained based on a ratio of the resolution of the first shadow map to the resolution of the second shadow map; and rendering code configured to cause the at least one processor to perform shadow rendering on the target virtual object according to the second texel range.

13. The image rendering apparatus according to claim 12, wherein the scaling code is further configured to cause the at least one processor:
obtain a distance set of the central point to texel points in the second texel range;
extract a texel point meeting an extraction condition from the distance set to determine an edge distance; and
determine a shadow edge region of the target virtual object according to the edge distance; and
the rendering code is configured to cause the at least one processor to:
render a corresponding part of the second shadow map based on the shadow edge region to perform shadow rendering on the target virtual object.

14. The image rendering apparatus according to claim 13, wherein the obtain a distance set of the central point to texel points in the second texel range comprises:
determining a first shadow value of the first shadow map, the first shadow value being determined based on an intersection situation of a first ray and the target virtual object, and the first ray being used for indicating a connecting line between the first shadow map and a light source;
determining a second shadow value of the second shadow map, the second shadow value being determined based on an intersection situation of a second ray and the target virtual object, and the second ray being used for indicating a connecting line between the second shadow map and the light source; and
obtaining the distance set of the central point to the texel points in the second texel range in a case that the first shadow value and the second shadow value are different.

15. The image rendering apparatus according to claim 14, wherein the obtaining a distance set of the central point to texel points in the second texel range comprises:
determining texel points covered by pixels occupied by the target virtual object in the second texel range; and
determining the distance set according to the texel points covered by the pixels.

16. The image rendering apparatus according to claim 15, wherein the rendering code is configured to cause the at least one processor to:
map texel points in the second texel range into a texel point in the corresponding first texel range to generate an association texel, the association texel being used for indicating a correspondence between one of the texel points in the first texel range and a plurality of texel points in the second texel range;
separately determine distance field values in the association texel; and
perform shadow rendering based on the distance field values.

17. The image rendering apparatus according to claim 16, wherein the rendering code is further configured to cause the at least one processor to:
perform iterative calculation based on the distance field values, to determine a change situation of the distance field values;
determine a minimum value of the distance field values based on the change situation of the distance field values; and
perform shadow rendering based on the minimum value of the distance field values.

18. The image rendering apparatus according to claim 15, wherein the rendering code is configured to cause the at least one processor to:
obtain shape information of the light source;
determine a penumbra parameter according to the shape information and the second texel range; and
perform shadow rendering on the target virtual object based on the penumbra parameter.

19. A non-transitory computer-readable storage medium, storing computer code that when executed by at least one processor causes the at least one processor to: obtain a first shadow map and a second shadow map of a target virtual object, a resolution of the first shadow map being less than a resolution of the second shadow map; determine a first texel range of each texel and a central point in the first shadow map, the first texel range being set based on a transition distance of a shadow edge and the transition distance being used for indicating a shadow edge of the target virtual object in the first shadow map; perform, based on the central point, scaling processing on the first texel range by using a scaling coefficient to obtain a second texel range, the scaling coefficient being obtained based on a ratio of the resolution of the first shadow map to the resolution of the second shadow map; and perform shadow rendering on the target virtual object according to the second texel range.

20. The non-transitory computer-readable storage medium according to claim 19, wherein after the performing, based on the central point, scaling processing on the first texel range the computer code causes the at least one processor to: obtain a distance set of the central point to texel points in the second texel range; extract a texel point meeting an extraction condition from the distance set to determine an edge distance; and determine a shadow edge region of the target virtual object according to the edge distance; and the perform shadow rendering on the target virtual object according to the second texel range comprises: rendering a corresponding part of the second shadow map based on the shadow edge region to perform shadow rendering on the target virtual object.

* * * * *